(12) United States Patent
Zhong (10) Patent No.: US 11,922,831 B2
(45) Date of Patent: Mar. 5, 2024

(54) ELECTRONIC DEVICE (71) Applicant: VIVO MOBILE COMMUNICATION CO., LTD., Guangdong (CN)

(72) Inventor: Hongjun Zhong, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 17/993,116

(22) Filed: Nov. 23, 2022

(65) Prior Publication Data

US 2023/0088917 A1 Mar. 23, 2023

Related U.S. Application Data (63) Continuation of application No. PCT/CN2021/095475, filed on May 24, 2021.

(30) Foreign Application Priority Data

May 28, 2020 (CN) .......................... 202010466210.5

(51) Int. Cl.
G09F 9/30 (2006.01)
G06F 1/16 (2006.01)

(52) U.S. Cl.
CPC ............ G09F 9/301 (2013.01); G06F 1/1652 (2013.01)

(58) Field of Classification Search
CPC ...... G06F 1/1624; G06F 1/1652; G06F 1/181; G09F 9/301; G09G 2380/02; H04M 1/0235; H04M 1/026; H04M 1/0268
See application file for complete search history.

(56) References Cited

U.S. PATENT DOCUMENTS

| 9,557,771 | B2 * | 1/2017 | Park | G06F 1/1681 |
| 9,560,750 | B2 * | 1/2017 | Lee | G06F 1/1652 |
| 10,602,623 | B1 | 3/2020 | Myers | |

(Continued)

FOREIGN PATENT DOCUMENTS

| CN | 107731103 A | 2/2018 |
| CN | 109062334 A | 12/2018 |

(Continued)

OTHER PUBLICATIONS

LG Electronics, "The new opponent of the folding screen mobile phone, 'stretch and unfold the screen', 'extend' the screen after LG's dual screen", Innovation, Nov. 19, 2019, 7 pages.

*Primary Examiner* — Joe H Cheng
(74) *Attorney, Agent, or Firm* — Price Heneveld LLP (57) ABSTRACT

An electronic device is provided, including a housing and a display screen covering the housing, where the housing includes a first housing portion, a second housing portion, and a third housing portion; when the electronic device is in a first state, the first and third housing portions are spliced, the electronic device performs displaying by the display screen covering the first and third housing portions, an accommodating space is formed between the first and third housing portions, and the second housing portion is accommodated in the accommodating space; and when the electronic device is in a second state, the first, second, and third housing portions are spliced, the second housing portion is located between the first and third housing portions, and the electronic device performs displaying by the display screen covering the first, second, and third housing portions.

10 Claims, 5 Drawing Sheets

(56) References Cited

U.S. PATENT DOCUMENTS

| | | | |
|---|---|---|---|
| 10,893,130 B1* | 1/2021 | Song | H04M 1/0237 |
| 11,100,818 B1* | 8/2021 | Feng | G09F 9/301 |
| 11,553,614 B2* | 1/2023 | Cho | G06F 1/1681 |
| 2013/0037228 A1 | 2/2013 | Verschoor et al. | |
| 2013/0058063 A1* | 3/2013 | O'Brien | G06F 1/1624 |
| | | | 361/807 |
| 2015/0185782 A1 | 7/2015 | Kim et al. | |
| 2016/0007441 A1 | 1/2016 | Matsueda | |
| 2016/0070303 A1 | 3/2016 | Lee et al. | |
| 2016/0216737 A1 | 7/2016 | Hayk et al. | |
| 2018/0196468 A1 | 7/2018 | Watamura et al. | |
| 2019/0198783 A1 | 6/2019 | Kim et al. | |
| 2019/0261519 A1* | 8/2019 | Park | H04M 1/0268 |
| 2019/0364682 A1 | 11/2019 | Kikuchi | |
| 2020/0135064 A1 | 4/2020 | Lee et al. | |
| 2022/0181222 A1* | 6/2022 | Endo | H05B 33/14 |

FOREIGN PATENT DOCUMENTS

| | | |
|---|---|---|
| CN | 109658826 A | 4/2019 |
| CN | 109769056 A | 5/2019 |
| CN | 109788097 A | 5/2019 |
| CN | 110010007 A | 7/2019 |
| CN | 110620834 A | 12/2019 |
| CN | 111147626 A | 5/2020 |
| CN | 111683166 A | 9/2020 |
| JP | 2016015618 A | 1/2016 |
| JP | 2018112835 A | 7/2018 |
| KR | 20170027222 A | 3/2017 |
| WO | 2014087951 A1 | 6/2014 |
| WO | 2018179309 A1 | 10/2018 |

\* cited by examiner

ELECTRONIC DEVICE

CROSS-REFERENCE TO RELATED APPLICATIONS

This application is a continuation application of PCT International Application No. PCT/CN2021/095475 filed on May 24, 2021, which claims priority to Chinese Patent Application No. 202010466210.5 filed in China on May 28, 2020, which are incorporated in their entireties by reference herein.

TECHNICAL FIELD

The present disclosure relates to the field of communication technologies, and in particular, to an electronic device.

BACKGROUND

With the development of electronic devices, demands of users for human-computer interaction are increasing and become more frequent. Therefore, requirements for the size and the available display region of the display screen are increasing, and a larger size of the display screen causes a larger size of the electronic device, resulting in poor portability of the electronic device.

SUMMARY

The present disclosure discloses an electronic device to resolve a problem of inconvenient carrying caused by an excessively large size of the electronic device.

To resolve the foregoing problem, the present disclosure is implemented as follows.

Embodiments of the present disclosure provide an electronic device, including:

a housing and a display screen covering the housing, where
the housing includes a first housing portion, a second housing portion, and a third housing portion;
when the electronic device is in a first state, the first housing portion and the third housing portion are spliced, the electronic device performs displaying by the display screen covering the first housing portion and the third housing portion, an accommodating space is formed between the first housing portion and the third housing portion, and the second housing portion is accommodated in the accommodating space; and
when the electronic device is in a second state, the first housing portion, the second housing portion, and the third housing portion are spliced, the second housing portion is located between the first housing portion and the third housing portion, and the electronic device performs displaying by the display screen covering the first housing portion, the second housing portion, and the third housing portion.

According to the technical solution provided in the embodiments of the present disclosure, the electronic device includes a first housing portion, a second housing portion, and a third housing portion; when the electronic device is in a first state, the first housing portion and the third housing portion are spliced, the electronic device performs displaying by a display screen covering the first housing portion and the third housing portion, an accommodating space is formed between the first housing portion and the third housing portion, and the second housing portion is accommodated in the accommodating space; and when the electronic device is in a second state, the first housing portion, the second housing portion, and the third housing portion are spliced, the second housing portion is located between the first housing portion and the third housing portion, and the electronic device performs displaying by the display screen covering the first housing portion, the second housing portion, and the third housing portion. Through relative motion between the first housing portion, the second housing portion, and the third housing portion, the housing can be switched between retraction and extension, thereby improving the portability of the electronic device. Moreover, the housing carries the display screen, and with the retraction or extension of the housing, the area of the display screen covering the housing is changed, so that the area of the available display region of the display screen can be changed, thereby meeting a use requirement of a user for a large display screen.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

REFERENCE NUMERALS OF THE ACCOMPANYING DRAWING

10 first housing portion, 102 first plate part, 104 second plate part, 106 first bent part, 20 second housing portion, 202 first support plate, 204 second support plate, 30 third housing portion, 302 third plate part, 304 fourth plate part, 306 second bent part, 40 accommodating space, 402 slide guide, 50 first link, 60 second link, 70 traction portion, 80 flexible display, 802 flexible screen, 804 flexible fixing member, 806 sliding groove, 8022 first screen body, 8024 second screen body, 8026 third screen body.

DETAILED DESCRIPTION

The following clearly describes the technical solutions in the embodiments of the present disclosure with reference to the accompanying drawings in the embodiments. Apparently, the described embodiments are merely some but not all of the embodiments of the present disclosure. Based on the embodiments of the present disclosure, all other embodiments obtained by a person of ordinary skill in the art without creative efforts shall fall within the protection scope of the present disclosure.

The embodiments of the present disclosure provide an electronic device, including a display screen and a housing, where the display screen covers the housing. When the electronic device is in a first state, a first housing portion 10 and a third housing portion 30 are spliced, and the electronic device performs displaying by the display screen covering the first housing portion 10 and the third housing portion 30; and when the electronic device is in a second state, the first housing portion 10, a second housing portion 20, and the third housing portion 30 are spliced, and the electronic device performs displaying by the display screen covering the first housing portion 10, the second housing portion 20, and the third housing portion 30. Through motion between the first housing portion 10, the second housing portion 20, and the third housing portion 30, the housing can be switched between retraction and extension, to improve the portability of the electronic device. In addition, the display screen covers the housing, and with the retraction or extension of the housing, the area of the available display region of the display screen can be changed, to meet a use requirement of a user for a large display screen. Specifically, the electronic device may be a mobile terminal such as a mobile phone, a wearable device, a tablet computer, a laptop computer, a mobile computer, an augmented reality device (also referred to as an AR device), a virtual reality device (also referred to as a VR device), a handheld game machine, or the like.

Figure 1:
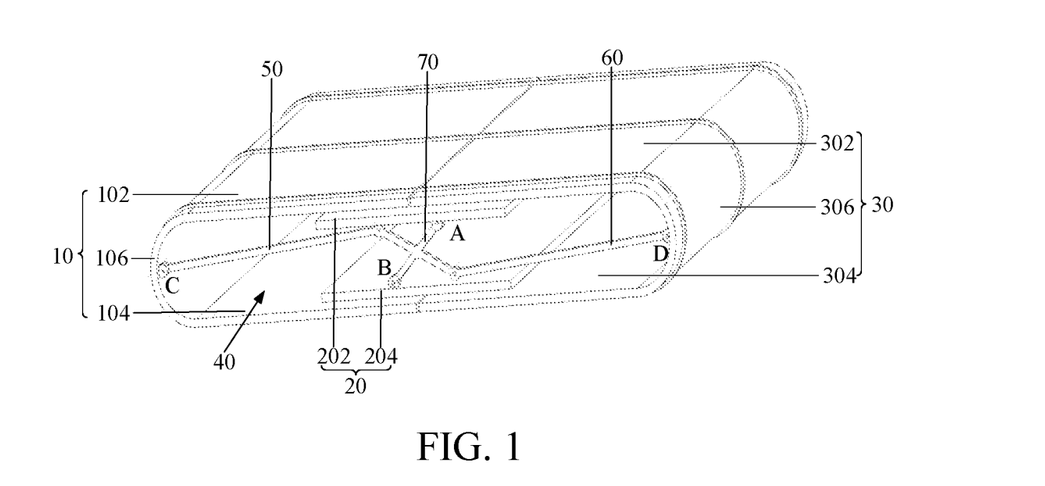
FIG. 1 is a schematic structural diagram 1 of an electronic device according to an embodiment of the present disclosure.

As shown in FIG. 1, an embodiment of the present disclosure provides an electronic device, including a housing and a display screen covering the housing. The housing includes a first housing portion 10, a second housing portion 20, and a third housing portion 30; when the electronic device is in a first state, the first housing portion 10 and the third housing portion 30 are spliced, the electronic device performs displaying by the display screen covering the first housing portion 10 and the third housing portion 30, an accommodating space 40 is formed between the first housing portion 10 and the third housing portion 30, and the second housing portion 20 is accommodated in the accommodating space 40; and when the electronic device is in a second state, the first housing portion 10, the second housing portion 20, and the third housing portion 30 are spliced, the second housing portion 20 is located between the first housing portion 10 and the third housing portion 30, and the electronic device performs displaying by the display screen covering the first housing portion 10, the second housing portion 20, and the third housing portion 30. Through elative motion between the first housing portion 10, the second housing portion 20, and the third housing portion 30, the housing can be switched between retraction and extension, and with the change of the housing, the area covered by the display screen on the housing is changed, that is, the available display region of the display screen is changed, which not only improves the portability of the electronic device, but also meets a use requirement of a user for a large display screen.

During specific application, when the electronic device is in the first state, the electronic device is in a retracted state, and when the electronic device is in the second state, the electronic device is in an extended state.

Figure 3:
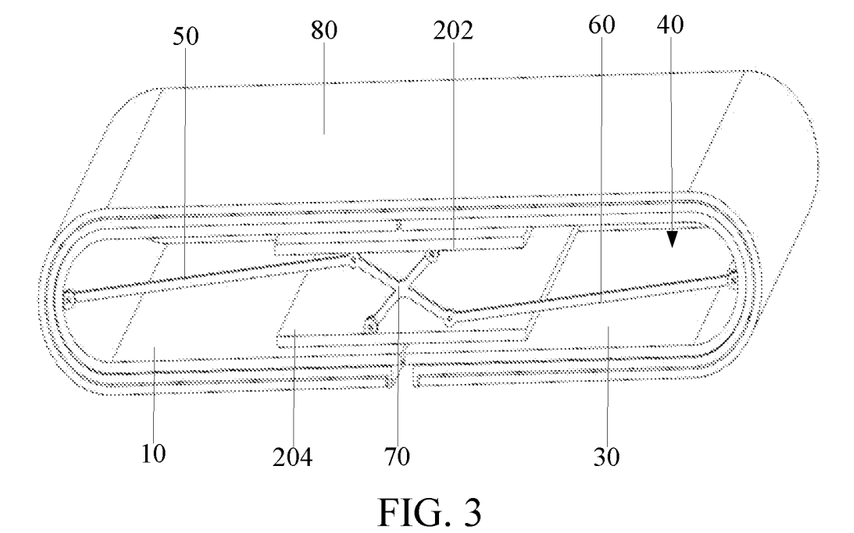
FIG. 3 is a schematic structural diagram 3 of an electronic device according to an embodiment of the present disclosure.

As shown in FIG. 1 and FIG. 3, when the electronic device is in the first state, the first housing portion 10 and the third housing portion 30 are spliced, and the second housing portion 20 is accommodated in the accommodating space 40; and when the electronic device is in the second state, the first housing portion 10, the second housing portion 20, and the third housing portion 30 are spliced, that is, the second housing portion 20 moves between the first housing portion 10 and the third housing portion 30, so that a surface area of the housing in the first state is smaller than the surface area of the housing in the second state, that is, the housing is in the retracted state in the first state and the housing is in the extended state in the second state. Therefore, when the electronic device is switched between the first state and the second state, the surface area of the housing is changed, which improves the portability of the electronic device.

When the electronic device is in the first state, the electronic device performs displaying by the display screen covering the first housing portion 10 and the third housing portion 30, and when the electronic device is in the second state, the electronic device performs displaying by the display screen covering the first housing portion 10, the second housing portion 20, and the third housing portion 30. Therefore, an available display region when displaying is performed by the display screen in the first state is smaller than an available display region when displaying is performed by the display screen in the second state, so that when the electronic device is switched between the first state and the second state, the available display region of the display screen is changed, to meet the use requirement of the user for a large display screen.

During specific application, the electronic device includes a front surface and a rear surface, and the electronic device performs displaying by the display screen located on the front surface of the electronic device. Certainly, the electronic device may also perform displaying by the display screen located on the rear surface of the electronic device at the same time.

It may be understood that, in this embodiment of this application, the first housing portion 10 and the third housing portion 30 are directly spliced, or the first housing portion 10 and the third housing portion 30 are spliced by using the second housing portion 20 to implement extension or retraction of the housing. That is, the size of the electronic device is not changed by folding, so that the display screen covering the housing does not need to be folded when the electronic device is switched between the first state and the second state, thereby avoiding affecting visual feeling and forming creases on the flexible screen 802 due to long-term folding of the display screen during folding.

In a possible implementation, the electronic device further includes a drive assembly and a traction structure. The traction structure is located in the accommodating space 40, and the traction structure is connected to the first housing portion 10, the second housing portion 20, and the third housing portion 30. The drive assembly drives the first housing portion 10, the second housing portion 20, and the third housing portion 30 to move relative to each other through the traction structure, so that the electronic device is switched between the first state and the second state. Under the drive of the drive assembly, relative motion among the first housing portion 10, the second housing portion 20, and the third housing portion 30 is implemented, so that the electronic device can be changed between the first state and the second state, which implements the portability of the electronic device and meets a user requirement of the available display region.

During specific application, under the drive of the drive assembly, the first housing portion 10 and the third housing portion 30 are relatively away from each other or close to each other.

When the electronic device is switched from the first state to the second state, the drive assembly drives the first housing portion 10 and the third housing portion 30 away from each other through the traction structure, and drives the second housing portion 20 to move between the first housing portion 10 and the third housing portion 30, so that the first housing portion 10 and the third housing portion 30 are spliced through the second housing portion 20.

When the electronic device is switched from the second state to the first state, the drive assembly drives the first housing portion 10 and the third housing portion 30 close to each other through the traction structure, and drives the second housing portion 20 to be accommodated in the accommodating space 40, so that the first housing portion 10 and the third housing portion 30 are spliced.

Figure 7:
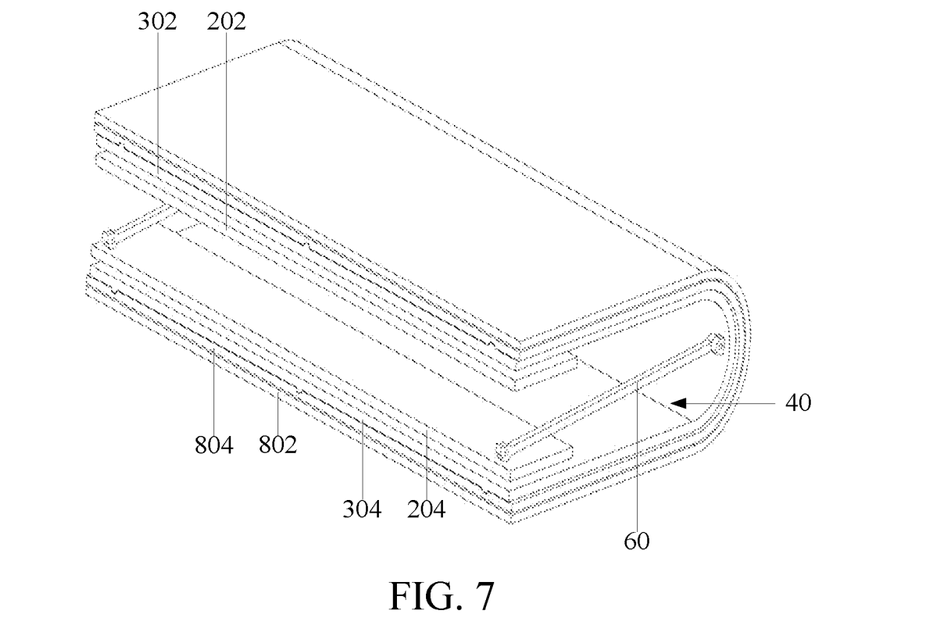

Further, as shown in FIG. 7, there are a plurality of traction structures, and the arrangement of the plurality of traction structures ensures a driving effect and a supporting effect on the second housing portion 20, thereby improving the stability of the housing.

During specific application, there are two traction structures.

In a possible implementation, the traction structure includes: a traction portion 70; a first link 50, where a first end of the first link 50 is hinged to the first housing portion 10, and a second end of the first link 50 is hinged to a first shaft of the traction portion 70; a second link 60, where a third end of the second link 60 is hinged to the third housing portion 30, a fourth end of the second link 60 is hinged to a second shaft of the traction portion 70, and the first shaft and the second shaft are on a same line; and a third shaft of the traction portion 70 is hinged to the second housing portion 20, and the third shaft forms a right angle with the first shaft.

In this way, the traction portion 70, the first link 50, and the second link 60 can move relative to each other, and can also move relative to the housing, so that the traction structure can be accommodated in the accommodating space 40 and the housing to move to the first state under the drive of the drive assembly, and can gradually extend and drive the housing to move toward the second state under the drive of the drive assembly.

That is, the housing is driven by the traction structure, the structure is simple and the operation is convenient, and the size of the traction structure can be changed, so that the traction structure can be accommodated in the accommodating space 40 in the first state, thereby reducing a space occupied by the traction structure.

During specific application, the traction portion 70 also includes a fourth shaft, and the fourth shaft and the third shaft are in a same straight line. As shown in FIG. 1, the traction portion 70 is in a "cross" shape.

Certainly, the traction structure may alternatively be in another shape. For example, the traction portion 70 is specifically a plate-shaped structure, or the traction portion 70 includes three rod-shaped structures sequentially connected end to end, or the traction portion 70 is a cam structure.

When the traction portion 70 is the plate-shaped structure, a cross section of the plate-shaped structure is triangular, and hinge portions are formed on vertexes of the triangle, where two hinge portions are respectively hinged to the second end of the first link 50 and the fourth end of the second link 60, and another hinge portion is hinged to the second housing portion 20.

It may be understood that the plate-shaped structure has two opposing planes with the largest area, and the cross section of the plate-shaped structure is also a cross section parallel to the plane with the largest area. Further, the three hinge portions are formed on three vertexes located in the same plane.

During specific application, the cross section of the plate-shaped structure is quadrilateral.

When the traction portion 70 includes the three rod-shaped structures, the three rod-shaped structures are sequentially connected end to end, and a hinge portion is formed at a connecting end of every two connected rod-shaped structures in the three rod-shaped structures. The three rod-shaped structures are connected end to end to form three connecting ends, and the three connecting ends are respectively provided with hinge portions. The second end of the first link 50, the fourth end of the second link 60, and the second housing portion 20 are hinged to the traction portion 70 through the hinge portions on the traction portion 70.

Any two connected rod-shaped structures are fixedly connected to ensure the stability of the traction portion 70.

When the traction portion 70 is the cam structure, a contour line of the cam structure includes a projecting point, a distance between the projecting point and a gyration center of the cam structure is a maximum value of distances between all points on the contour line of the cam structure and the gyration center, and the traction portion 70 is hinged to the second housing portion 20 at the projecting point. The traction portion 70 is further provided with two hinge portions, the second end of the first link 50 and the fourth end of the second link 60 are hinged to the traction portion 70 through the two hinge portions, and a connecting line of the two hinge portions passes through the gyration center. A hinge portion hinged to the second housing portion 20 is arranged at the projecting point of the cam structure, so that when the housing is changed from the first state to the second state, the second housing portion 20 can be gradually spliced with the first housing portion 10 and the third housing portion 30, and when the housing is changed from the second state to the first state, the second housing portion 20 can gradually move toward the accommodating space 40.

During specific application, when the second housing portion 20 includes a first support plate 202 and a second support plate 204, there are two projecting points. The first support plate 202 is hinged to the traction portion 70 at one of the projecting points, and the second support plate 204 is hinged to the traction portion 70 at the other of the two projecting points. In this way, when the housing is changed from the first state to the second state, the first support plate 202 can gradually move close to a first plate part 102 and a third plate part 302 until moving between the first plate part 102 and a third plate part 302, and the second support plate 204 can gradually move close to the second plate part 104 and a fourth plate part 304 until moving between the second plate part 104 and the fourth plate part 304. Accordingly, when the housing is changed from the second state to the first state, the first support plate 202 can gradually move away from the first plate part 102 and the third plate part 302 until being accommodated in the accommodating space 40, and the second support plate 204 can gradually move away from the second plate part 104 and the fourth plate part 304 until being accommodated in the accommodating space 40.

Further, a connecting line of two projecting points passes through the gyration center, and distances between the two projecting points and the gyration center are the same, so that the distance between any one of the two projecting points and the gyration center is a maximum value of the distances between all points on the contour line and the gyration center.

Certainly, the distances between the two projecting points and the gyration center may alternatively be different. In this case, the distance between the first projecting point of the two projecting points and the gyration center is greater than the distance between the second projecting point of the two projecting points and the gyration center, and the distance between the second projecting point and the gyration center is greater than the distances between all points on the contour other than the two projecting points and the gyration center.

It should be noted that, the traction portion 70 may have a variety of shapes. As long as the electronic device is switched from the first state to the second state, the traction portion 70 can drive the second housing portion 20 to move between the first housing portion 10 and the third housing portion 30. When the electronic device is switched from the second state to the first state, the traction portion 70 can drive the second housing portion 20 to move toward the accommodating space 40. Other structures are not described in detail and are within the scope of protection of this application.

In a possible implementation, as shown in FIG. 1, the first housing portion 10 includes a first plate part 102, a second plate part 104, and a first bent part 106. The first plate part 102 and the second plate part 104 are oppositely arranged and connected through the first bent part 106, and the first end of the first link 50 is hinged to the first bent part 106. The third housing portion 30 includes a third plate part 302, a fourth plate part 304, and a second bent part 306. The third plate part 302 and the fourth plate part 304 are oppositely arranged and connected through the second bent part 306, and the third end of the second link 60 is hinged to the second bent part 306.

In this embodiment, the first housing portion 10 and the third housing portion 30 are bent, so that the first housing portion 10 and the third housing portion 30 can define the accommodating space 40 for accommodating the second housing portion 20 in the first state. In addition, the first housing portion 10 and the third housing portion 30 that are bent also provide an extensible space for the display screen, so that the display screen may extend along the first bent part 106 toward the second plate part 104 and along the second bent part 306 toward the fourth plate part 304.

During specific applications, as shown in FIG. 1, the first bent part 106 is connected to an end of the first plate part 102 and an end of the second plate part 104, and the second bent part 306 is connected to an end of the third plate part 302 and an end of the fourth plate part 304.

As shown in FIG. 1, the first bent part 106 is arc-shaped; or a part where the first bent part 106 is connected to the first plate part 102 has a rounded corner, and a part where the first bent part 106 is connected to the second plate part 104 has a rounded corner. In this way, the first bent part 106 and the first plate part 102 are in a smooth transition connection, and the first bent part 106 and the second plate part 104 are in a smooth transition connection, that is, the connected parts between the first bent part 106 and the first plate part 102 as well as the second plate part 104 has no corner, to protect the display screen from being scratched by the corner.

As shown in FIG. 1, the second bent part 306 is arc-shaped; or a part where the second bent part 306 is connected to the third plate part 302 has a rounded corner, and a part where the second bent part 306 is connected to the fourth plate part 304 has a rounded corner. In this way, the second bent part 306 and the third plate part 302 are in a smooth transition connection, and the second bent part 306 and the fourth plate part 304 are in a smooth transition connection, that is, the connected parts between the second bent part 306 and the third plate part 302 as well as the fourth plate part 304 has no corner, to protect the display screen from being scratched by the corner.

Further, as shown in FIG. 1, one end of the first plate part 102 away from the first bent part 106 is arranged corresponding to one end of the third plate part 302 away from the second bent part 306, and one end of the second plate part 104 away from the first bent part 106 is arranged corresponding to one end of the fourth plate part 304 away from the second bent part 306. Specifically, both the first housing portion 10 and the third housing portion 30 are "U" shaped, and opening ends of the two "U" shapes correspond to each other.

Further, the size of the first plate part 102 is the same as that of the second plate part 104, and the size of the third plate part 302 is the same as that of the fourth plate part 304.

In a possible implementation, the second housing portion 20 includes a first support plate 202 and a second support plate 204. The first support plate 202 is hinged to the third shaft of the traction portion 70, and the second support plate 204 is hinged to the fourth shaft of the traction portion 70. In the second state, the first plate part 102, the first support plate 202, and the third plate part 302 are spliced, and the first support plate 202 is located between the first plate part 102 and the third plate part 302. The second plate part 104, the second support plate 204, and the fourth plate part 304 are spliced, and the second support plate 204 is located between the second plate part 104 and the fourth plate part 304. Through the first support plate 202 and the second support plate 204, when the electronic device is in the second state, the first housing portion 10 and the third housing portion 30 can be spliced on both the front surface and the rear surface, thereby improving the stability of the housing and effectively avoiding resilience of the first housing portion 10 and the second housing portion 20.

Figure 4:
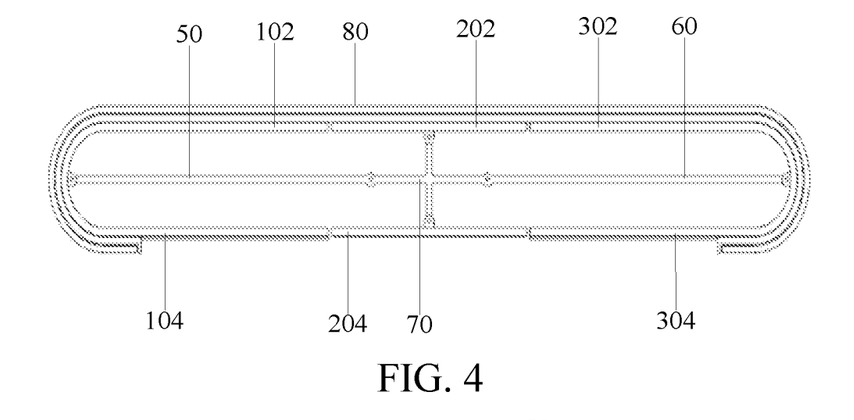
FIG. 4 is a schematic structural diagram 4 of an electronic device according to an embodiment of the present disclosure.

It should be noted that, as shown in FIG. 4, when the electronic device is in the second state, in a relative motion direction of the first housing portion 10 and the third housing portion 30 (that is, a direction E in FIG. 5), gaps exist between two ends of the first support plate 202 and the first plate part 102 as well as the third plate part 302, and gaps exist between two ends of the second support plate 204 and the second plate part 104 as well as the fourth plate part 304, so that when the housing is changed from the second state to the first state, it is ensured that the first support plate 202 and the second support plate 204 can be accommodated in the accommodating space 40 as the first housing portion 10 and the third housing portion 30 are close to each other. As shown in FIG. 3, FIG. 6, and FIG. 7, in the first state, the first support plate 202 faces a surface of the first plate part 102 and/or the third plate part 302, and a gap exists between the first support plate and the surface of the first plate part 102 and/or the third plate part 302. The second support plate 204 faces a surface of the second plate part 104 and/or the fourth plate part 304, and a gap exists between the second support plate and the surface of the second plate part 104 and/or the fourth plate part 304. In this way, when the housing is changed from the first state to the second state, it is ensured that a specific extensible space exists between the first support plate 202 and the second support plate 204, so that in the second state, the first support plate 202 and the surfaces of the first plate part 102 and the third plate part 302 are in a same plane, and the second support plate 204 and the surfaces of the second plate part 104 and the fourth plate part 304 are in a same plane.

Certainly, the second housing portion 20 may alternatively have an elastic structure. In this case, no gap may exist.

In a possible implementation, as shown in FIG. 3, the display screen is specifically a flexible display 80, and the flexible display 80 is slidably connected to the housing. In the first state, the flexible display 80 covers the first plate part 102 and the third plate part 302, one end of the flexible display 80 extends to the second plate part 104 along the first bent part, and an other end of the flexible display extends to the fourth plate part 304 along the second bent part. In the second state, the flexible display 80 covers the first plate part 102, the first support plate 202, and the third plate part 302. The first housing portion 10, the second housing portion 20, and the third housing portion 30 move relative to each other, so that the flexible display 80 slides relative to the housing, thereby implementing extension and retraction of the flexible display 80 and avoiding problems such as creases and screen redundancy caused by folding the flexible display 80.

As shown in FIG. 3, when the electronic device is in the first state, the flexible display 80 covers the first plate part 102 and the third plate part 302. As shown in FIG. 4, when the electronic device is in the second state, the flexible display 80 covers the first plate part 102, the first support plate 202, and the second plate part 104. Apparently, the area of the display screen for displaying when the electronic device is in the second state is larger than the area of the display screen for displaying when the electronic device is in the first state.

When the electronic device is switched from the first state to the second state, the second housing portion 20 moves between the first housing portion 10 and the third housing portion 30, and the flexible display 80 accommodated on the second flat plate part 104 and the fourth plate part 304 slides toward the first plate part 102 and the third plate part 302 with the change of the housing, so that the flexible display 80 is gradually unfolded on the first plate part 102, the first support plate 202, and the third plate part 302.

Figure 5:
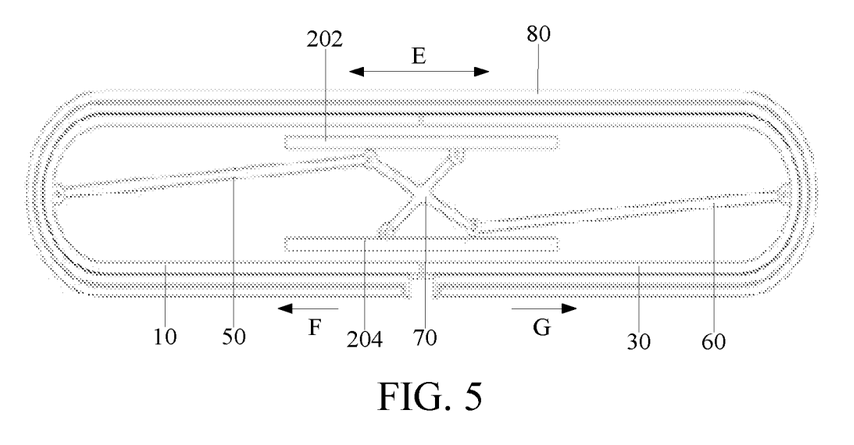
FIG. 5 is a schematic structural diagram 5 of an electronic device according to an embodiment of the present disclosure.
Figure 6:
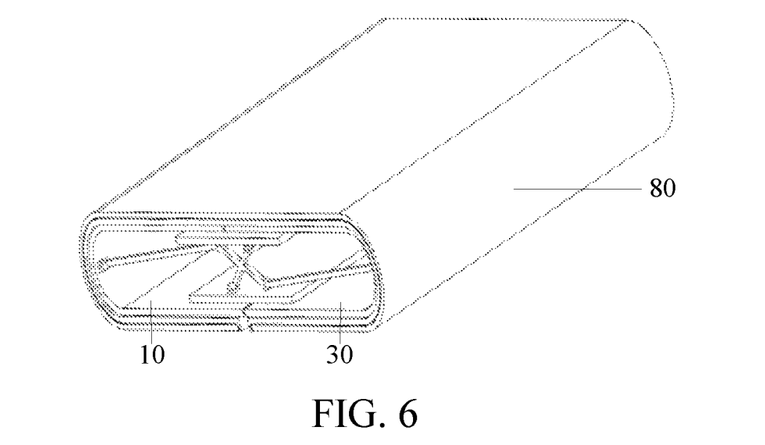
FIG. 6 is a schematic structural diagram 6 of an electronic device according to an embodiment of the present disclosure.

During specific application, as shown in FIG. 5, the first housing portion 10 and the third housing portion 30 are away from each other along the direction E, and one end of the flexible display 80 extending to the second plate part 104 and one end of the flexible display extending to the fourth plate part 304 respectively move in a direction F and a direction G, so that in the first state, a part of the flexible display 80 accommodated on the second plate part 104 extends to the first plate part 102, and a part of the flexible display 80 accommodated on the fourth plate part 304 extends to the third plate part 302, and the display screen is in an unfolded state (referring to FIG. 4).

Further, one end of the flexible display 80 extending the second plate part 104 and one end of the flexible display extending to the fourth plate part 304 are away from each other at the same speed, thereby avoiding stacking of the flexible display 80 during the change of the housing.

When the electronic device is switched from the second state to the first state, the first housing portion 10 and the third housing portion 30 close to each other, the first support plate 202 and the second support plate 204 move toward the accommodating space 40, and one end of the flexible display 80 extending to the second plate part 104 and one end of the flexible display extending to the fourth plate part 304 slide close to each other respectively, so that the flexible display 80 gradually retracts.

Further, one end of the flexible display 80 extending to the second plate part 104 and one end of the flexible display extending to the fourth plate part 304 are close to each other at the same speed, thereby avoiding stacking of the flexible display 80 during the change of the housing.

It can be learned from above that, in this embodiment, two ends of the flexible display 80 are both slidably connected to the housing.

Certainly, only one end of the flexible display 80 may alternatively be slidably connected to the housing and the other end of the flexible display fixedly connected to the housing. For example, one end of the flexible display 80 may alternatively be fixedly connected to one of the first housing portion 10 or the third housing portion 30 and the other end of the flexible display slidably connected to the other of the first housing portion 10 or the third housing portion 30 in the relative motion direction of the first housing portion 10 and the third housing portion 30. Specifically, one end fixedly connected to one of the first housing portion 10 or the third housing portion 30 may be located on the front surface of the housing (that is, on the first plate part 102 or the third plate part 302), or may be located on the rear surface of the housing (that is, on the second plate part 104 or the fourth plate part 304), or located on a side of the housing (that is, on the first bent part or the second bent part). One end slidably connected to the other of the first housing portion 10 or the third housing portion 30 extends to the rear surface of the housing, so that during relative motion of the first housing portion 10 and the third housing portion 30, the flexible display 80 is retracted and unfolded through sliding of one end slidably connected to the other one of the first housing portion 10 or the third housing portion 30.

Figure 2:
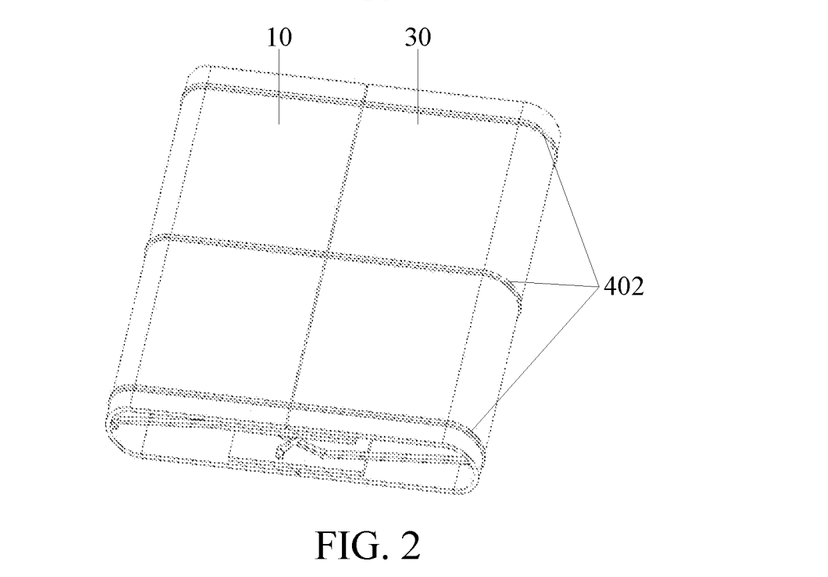
FIG. 2 is a schematic structural diagram 2 of an electronic device according to an embodiment of the present disclosure.

In a possible implementation, as shown in FIG. 2, the first housing portion 10 and the third housing portion 30 are provided with slide guides 402, and the flexible display 80 is arranged on the slide guides 402. By arranging the slide guides 402, the flexible display 80 and the housing are slidable relative to each other, thereby implementing the retraction and extension of the display screen, achieving the portability of the electronic device, and avoiding the problems of creases and screen redundancy caused by a foldable screen.

Figure 8:
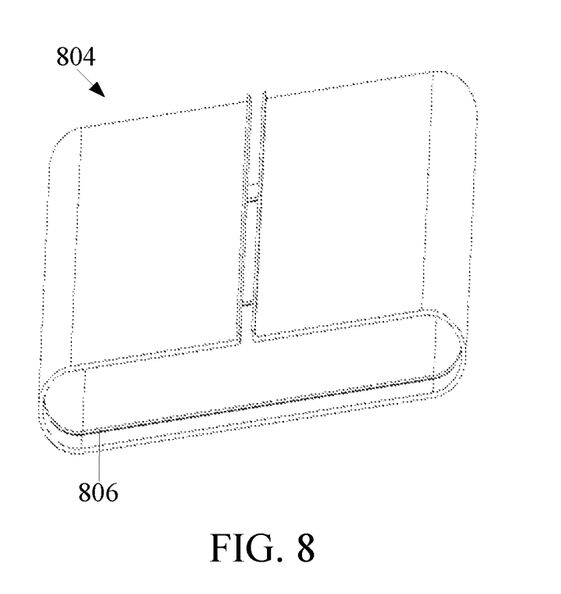
FIG. 8 is a schematic structural diagram of a flexible fixing member of an electronic device according to an embodiment of the present disclosure.

Further, as shown in FIG. 7 and FIG. 8, the flexible display 80 includes a flexible fixing member 804 and a flexible screen 802 arranged on the flexible fixing member 804, a sliding groove 806 is provided on the flexible fixing member 804, and the sliding groove 806 is slidably connected to the slide guides 402. Sliding of the flexible screen 802 is implemented by the flexible fixing member 804, which protects the flexible screen 802 from being scratched due to a plurality of times of extension and retraction.

Further, there are a plurality of slide guides 402 and a plurality of sliding grooves 806, and a quantity of the slide guides 402 is the same as a quantity of the sliding grooves 806. Through the plurality of slide guides 402 and the plurality of sliding grooves 806, the flexible display 80 can slide more smoothly with the housing.

During specific application, a shape of a cross section of the slide guide 402 is any one of the following: a trapezoid, a triangle, or a square.

It may be understood that the cross section of the slide guide 402 is a cross section of the slide guide 402 perpendicular to the relative motion direction of the first housing portion 10 and the third housing portion 30 (the direction E in FIG. 5).

Figure 9:
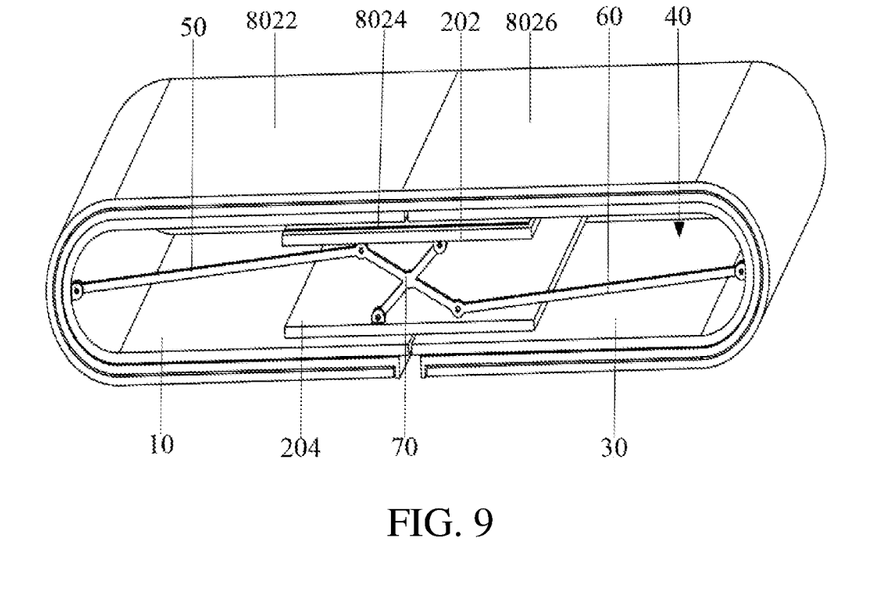
FIG. 9 is a schematic structural diagram 7 of an electronic device according to an embodiment of the present disclosure.

In a possible implementation, as shown in FIG. 9, the display screen includes: a first screen body 8022, where the first screen body 8022 is arranged on the first housing portion 10; a second screen body 8024, where the second screen body 8024 arranged on the second housing portion 20; and a third screen body 8026 where the third screen body 8026 is arranged on the third housing portion 30. In the first state, the first screen body 8022 and the third screen body 8026 are spliced, and the second screen body 8024 is accommodated in the accommodating space 40 along with the second housing portion 20; and in the second state, the first screen body 8022, the second screen body 8024, and the third screen body 8026 are spliced, and the second screen body 8024 is located between the first screen body 8022 and the third screen body 8026. The first screen body 8022 the second screen body 8024, and the third screen body 8026 are spliced, to change the area of the available display region of the display screen. In addition, the first screen body, the second screen body, and the third screen body are spliced, and the display screen does not need to be folded, which avoids creases.

The drive assembly drives the first housing portion 10 and the third housing portion 30 away from each other through the traction structure, and the second housing portion 20 moves between the first housing portion 10 and the third housing portion 30, so that the first screen body, the second screen body, and the third screen body are spliced together, and the display screen is in an expanded state.

The drive assembly drives the first housing portion 10 and the third housing portion 30 close to each other through the traction structure, and the second housing portion 20 moves towards the accommodating space 40, so that the first screen body and the second screen body are spliced together, and the display screen is in a reduced state.

During specific application, when the first housing portion 10 includes the first plate part 102, the second plate part 104, and the first bent part 106, the second housing portion 20 includes the first support plate 202 and the second support plate 204, and the third housing portion 30 includes the third plate part 302, the fourth plate part 304, and the second bent part 306, the first screen body is arranged on the first plate part 102, the second screen body is arranged on the first support plate 202, and the third screen body is arranged on the third plate part 302, so that the first screen body, the second screen body, and the third screen body can be spliced on the front surface of the electronic device.

Further, the first screen body, the second screen body, and the third screen body are specifically liquid crystal panels, and the liquid crystal panels are fixedly arranged on the housing. The first screen body, the second screen body, and the third screen body are specifically liquid crystal panels, which improves the strength of the display screen.

Referring to FIG. 1 to FIG. 8, an electronic device according to an embodiment of the present disclosure is described in detail below. The electronic device includes a flexible display 80, a housing, and a traction structure. The housing carries the flexible display 80 and includes a first housing portion 10, a second housing portion 20, and a third housing portion 30. As shown in FIG. 1, the first housing portion 10 is defined by a first plate part 102, a second plate part 104, and a first bent part 106 connecting the first plate part and the second plate part, the second housing portion 20 includes a first support plate 202 and a second support plate 204, and the third housing portion 30 is defined by a third plate part 302, a fourth plate part 304, and a second bent part 306 connecting the third plate part and the fourth plate part. The electronic device can be retracted into a first state or extended into a second state. As shown in FIG. 1 and FIG. 3, when the electronic device is in the first state, the first housing portion 10 and the third housing portion 30 are spliced and form an accommodating space 40, and the traction structure, the first support plate 202, and the second support plate 204 are accommodated in the accommodating space 40. As shown in FIG. 4, when the electronic device is in the second state, the first plate part 102 and the third plate part 302 are spliced through the first support plate 202, and the second plate part 104 and the fourth plate part 304 are spliced through the second support plate 204. As shown in FIG. 1, the traction structure includes a first link 50, a second link 60, and a traction portion 70. The traction portion 70 includes a first shaft, a second shaft, a third shaft, and a fourth shaft. The first shaft and the second shaft are located in a same straight line, the third shaft and the fourth shaft are located in a same straight line, and the first shaft is perpendicular to the third shaft. A second end of the first link 50 is hinged to the first shaft of the traction portion 70, a fourth end of the second link 60 is hinged to the second shaft of the traction portion 70, the first support plate 202 is hinged to the third shaft of the traction portion 70 at a position A, the second support plate 204 is hinged to the fourth shaft of the traction portion 70 at a position B, a first end of the first link 50 is hinged to the first housing portion 10 at a position C, and a third end of the second link 60 is hinged to the third housing portion 30 at a position D. As shown in FIG. 6 and FIG. 7, the flexible display 80 includes a flexible fixing member 804 and a flexible screen 802 arranged on the flexible fixing member 804. Two ends of the flexible display 80 extends from the first bent part 106 and the second bent part 306 to the second plate part 104 and the fourth plate part 304 respectively. As shown in FIG. 2 and FIG. 8, slide guides 402 are arranged on an outer surface of the first housing portion 10 and an outer surface of the third housing portion 30, a sliding groove 806 is provided on an inner surface of the flexible fixing member 804, and the flexible display 80 slides on the housing through the cooperation of the slide guide 402 and the sliding groove 806.

The first housing portion 10, the second housing portion 20, and the third housing portion 30 move relative to each other, so that the housing can be retracted and extended. Moreover, because the flexible display 80 and the housing can slide relative to each other, the flexible display 80 is retracted with the retraction of the housing, and the flexible display 80 is unfolded with the extension of the housing, that is, the operation of changing a small screen into a large screen on the electronic device is implemented, so that the electronic device is also convenient to carry. In addition, the available display region of the flexible display 80 is changed by retraction and extension, thereby avoiding problems such as creases caused by folding the flexible display 80 and creases in an inner layer caused by inconsistent lengths of the inner and outer layers of the flexible display 80 during folding of the flexible display 80.

Specifically, as shown in FIG. 5, an original state of the electronic device is the first state, and the electronic device is pulled to two sides in the direction E. The first housing portion 10 and the third housing portion 30 are relatively away from each other in the direction E, and the first support plate 202 and the second support plate 204 respectively move between the first housing portion 10 and the third housing portion 30 and are parallel to each other, to prevent the traction structure from being retracted. In this case, the flexible fixing member 804 moves in the direction F and the direction G through the trapezoidal slide guides 402 on the first housing portion 10 and the third housing portion 30 until moving to the second state shown in FIG. 4, so that the flexible display 80 is completely opened, the screen becomes large, and the available display region of the flexible display 80 becomes large, thereby meeting a use requirement of a user for a large display screen.

It should be noted that the terms "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. The term such as "a plurality of" means two or more, unless otherwise definitely and specifically limited. Terms such as "interconnection", "connection", and "fixing" shall be understood in a broad sense. For example, "connection" may be a fixing connection, a detachable connection, or an integral connection; "interconnection" may be a direct connection, or an indirect connection by using an intermediate medium. The terms "first", "second", and the like herein are intended to distinguish between different objects but do not indicate a particular order of the objects. A person of ordinary skill in the art can understand specific meanings of the foregoing terms in this application according to a specific situation.

The embodiments of the present disclosure are described above with reference to the accompanying drawings. However, the present disclosure is not limited to the specific embodiments described above, and the specific embodiments described above are merely exemplary and not limitative. A person of ordinary skill in the art may make many forms without departing from the idea of the present disclosure and the protection scope of the claims. All of the forms shall fall within the protection of the present disclosure.

What is claimed is:

1. An electronic device, comprising:
a housing and a display screen covering the housing, wherein
the housing comprises a first housing portion, a second housing portion, and a third housing portion;
when the electronic device is in a first state, the first housing portion and the third housing portion are spliced, the electronic device performs displaying by the display screen covering the first housing portion and the third housing portion, an accommodating space is formed between the first housing portion and the third housing portion, and the second housing portion is accommodated in the accommodating space; and
when the electronic device is in a second state, the first housing portion, the second housing portion, and the third housing portion are spliced, the second housing portion is located between the first housing portion and the third housing portion, and the electronic device performs displaying by the display screen covering the first housing portion, the second housing portion, and the third housing portion;
wherein the electronic device further comprises a traction structure, wherein the traction structure is located in the accommodating space, the traction structure is connected to the first housing portion, the second housing portion, and the third housing portion; and the first housing portion, the second housing portion, and the third housing portion are configured to be driven to move relative to each other through the traction structure, so that the electronic device is switched between the first state and the second state;
wherein the traction structure comprises:
a traction portion;
a first link, wherein a first end of the first link is hinged to the first housing portion, and a second end of the first link is hinged to a first shaft of the traction portion; and
a second link, wherein a third end of the second link is hinged to the third housing portion, a fourth end of the second link is hinged to a second shaft of the traction portion, the first shaft and the second shaft are on a same line; and
a third shaft of the traction portion is hinged to the second housing portion, and the third shaft forms a right angle with the first shaft.

2. The electronic device according to claim 1, wherein
the first housing portion comprises a first plate part, a second plate part, and a first bent part, the first plate part and the second plate part are oppositely arranged and connected through the first bent part, the first end of the first link is hinged to the first bent part; and
the third housing portion comprises a third plate part, a fourth plate part, and a second bent part, the third plate part and the fourth plate part are oppositely arranged and connected through the second bent part, and the third end of the second link is hinged to the second bent part.

3. The electronic device according to claim 2, wherein
the second housing portion comprises a first support plate and a second support plate, wherein the first support plate is hinged to the third shaft of the traction portion, and the second support plate is hinged to a fourth shaft of the traction portion; and
in the second state, the first plate part, the first support plate, and the third plate part are spliced, and the first support plate is located between the first plate part and the third plate part; and the second plate part, the second support plate, and the fourth plate part are spliced, and the second support plate is located between the second plate part and the fourth plate part.

4. The electronic device according to claim 3, wherein
the display screen is specifically a flexible display, and the flexible display is slidably connected to the housing;
in the first state, the flexible display covers the first plate part and the third plate part, one end of the flexible display extends to the second plate part along the first bent part, and an other end of the display screen extends to the fourth plate part along the second bent part; and
in the second state, the flexible display covers the first plate part, the first support plate, and the third plate part.

5. The electronic device according to claim 4, wherein the first housing portion and the third housing portion are provided with slide guides, and the flexible display is arranged on the slide guides.

6. The electronic device according to claim 5, wherein the flexible display comprises a flexible fixing member and a flexible screen arranged on the flexible fixing member, a sliding groove is provided on the flexible fixing member, and the sliding groove is slidably connected to the slide guides.

7. The electronic device according to claim 3, wherein the display screen comprises:
a first screen body, wherein the first screen body is arranged on the first housing portion;
a second screen body, wherein the second screen body is arranged on the second housing portion; and a third screen body, wherein the third screen body is arranged on the third housing portion, wherein in the first state, the first screen body and the third screen body are spliced, and the second screen body is accommodated in the accommodating space along with the second housing portion; and in the second state, the first screen body, the second screen body and the third screen body are spliced, and the second screen body is located between the first screen body and the third screen body.

8. The electronic device according to claim 2, wherein the display screen comprises:

a first screen body, wherein the first screen body is arranged on the first housing portion;

a second screen body, wherein the second screen body is arranged on the second housing portion; and a third screen body, wherein the third screen body is arranged on the third housing portion, wherein in the first state, the first screen body and the third screen body are spliced, and the second screen body is accommodated in the accommodating space along with the second housing portion; and in the second state, the first screen body, the second screen body and the third screen body are spliced, and the second screen body is located between the first screen body and the third screen body.

9. The electronic device according to claim 1, wherein the display screen comprises:

a first screen body, wherein the first screen body is arranged on the first housing portion;

a second screen body, wherein the second screen body is arranged on the second housing portion; and a third screen body, wherein the third screen body is arranged on the third housing portion, wherein in the first state, the first screen body and the third screen body are spliced, and the second screen body is accommodated in the accommodating space along with the second housing portion; and in the second state, the first screen body, the second screen body and the third screen body are spliced, and the second screen body is located between the first screen body and the third screen body.

10. The electronic device according to claim 9, wherein the first screen body, the second screen body, and the third screen body are specifically liquid crystal panels, and the liquid crystal panels are fixedly arranged on the housing.

* * * * *